United States Patent [19]
Matsuoka et al.

[11] Patent Number: 5,158,833
[45] Date of Patent: Oct. 27, 1992

[54] MAGNETIC RECORDING MEDIUM

[75] Inventors: Shinya Matsuoka; Masaki Ohura, both of Odawara; Takaaki Shirakura, Chigasaki; Yoshihiro Shiraisi, Hachiouji, all of Japan

[73] Assignee: Hitachi, Ltd., Tokyo, Japan

[21] Appl. No.: 484,526

[22] Filed: Feb. 26, 1990

[30] Foreign Application Priority Data

Feb. 28, 1989 [JP] Japan .................. 1-45397

[51] Int. Cl.$^5$ ............................. G11B 23/00
[52] U.S. Cl. .................... 428/678; 428/408; 428/611; 428/694; 428/695; 428/900
[58] Field of Search .......... 428/694, 900, 408, 695, 428/611, 678

[56] References Cited

U.S. PATENT DOCUMENTS

| | | | |
|---|---|---|---|
| 4,587,178 | 5/1986 | Shimizu et al. | 428/678 |
| 4,594,296 | 6/1986 | Noguchi et al. | 428/611 |
| 4,889,767 | 12/1989 | Yokoyama et al. | 428/695 |
| 5,006,388 | 4/1991 | Kuzuo et al. | 428/678 |

Primary Examiner—Paul J. Thibodeau
Assistant Examiner—Leszek Kiliman
Attorney, Agent, or Firm—Fay, Sharpe, Beall, Fagan, Minnich & McKee

[57] ABSTRACT

A magnetic recording medium having high recording density and being capable of obtaining excellent overwrite characteristics by having a magnetic layer including Co and Ni as its principal components on a non-magnetic substrate, the Ni content of the magnetic layer is greater at portions closer to the surface of the magnetic layer in the direction of its thickness; the Ni content at portions closer to the surface of the magnetic layer is 20~50 at %; and the portion closer to the surface of the magnetic layer has at least one element selected from the group consisting of Zr, Ti, Pt, Ru, Ta, Rh, V, Nb, Cr and Pd.

23 Claims, 1 Drawing Sheet

MAGNETIC RECORDING MEDIUM

BACKGROUND OF THE INVENTION

This invention relates to a magnetic recording medium for use in a magnetic recording apparatus such as a magnetic disk and more particularly, to a magnetic recording medium suitable for high recording density and having excellent corrosion resistance.

Thin film magnetic recording media using a metallic magnetic thin film formed by spattering, plating, vacuum deposition, or the like, have been proposed in the past as the magnetic recording media for high density recording. In comparison with so-called "coating type magnetic recording media" consisting of $\gamma$-$Fe_2O_3$ and a binder, these thin film magnetic recording media exhibit excellent magnetic characteristics because the thickness of the magnetic film can be reduced easily and the magnetic properties in the magnetic film can be improved. With the recent demand for higher recording density and higher reliability, magnetic recording media having high corrosion resistance have been proposed and Japanese Patent Laid-Open No. 29317/1988, for example, discloses a magnetic recording medium using a material which contains Co, Ni, and Zr, or contains Co, Ni, Zi, Ti, Cr, Nb, and the like as the magnetic film.

SUMMARY

The prior art techniques described above do not consider the over-write characteristics which become a problem in a magnetic recording medium having high coercive force and therefore they cannot satisfy the requirement for higher recording density.

It is an object of the present invention to provide a magnetic recording medium having high recording density and being capable of obtaining excellent over-write characteristics.

The object described above can be accomplished by a magnetic recording medium having a magnetic layer including Co and Ni as its principal components on a non-magnetic substrate, the Ni content of the magnetic layer is greater at portions closer to the surface of the magnetic layer in the direction of its thickness; the Ni content at portions closer to the surface of the magnetic layer is 20~50 at %; and the portion closer to the surface of the magnetic layer has a composition consisting of Co, Ni and at least one element selected from the group consisting of Zr, Ti, Pt, Ru, Ta, Rh, V, Nb, Cr and Pd.

BRIEF DESCRIPTION OF THE DRAWINGS

Further objects, features and advantages of the present invention will become more clear upon the following detailed description of preferred embodiments as shown in the drawings, wherein.

DETAILED DESCRIPTION

Figure 1:
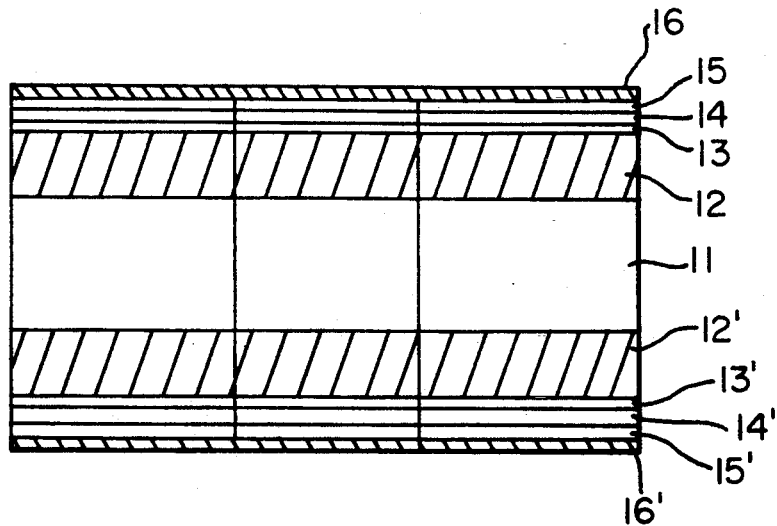
FIG. 1 is a schematic cross-sectional view of a magnetic recording medium in accordance with the present invention.

In the present invention, the surface layer of the magnetic layer or in other words, the surface area opposed to a magnetic head, has high coercive force in order to increase recording density. Accordingly, this portion has Ni content in a range of 20 to 50 at %. Furthermore, this surface layer preferably has a composition having high corrosion resistance. An example of such a composition consists of Co, Ni and at least one element selected from the group consisting of Zr, Ti, Pt, Ru, Ta, Rh, V, Nb, Cr and Pd. In this case, the amount of Co is preferably within a range of 30 to 60 at % and the amount of Ni is preferably within a range of 20 to 50 at %. The amount(s) of other element(s) is preferably within the range of 0.1~20 at %. Furthermore, the total amount of Ni and other elements than Co is preferably within a range of 40 to 70 at % from the aspect of saturation magnetization.

The surface layer is preferably at least 5 nm thick and more preferably, at least 10 nm thick.

The lower layer portion to the interior of the surface layer portion of the magnetic layer may have a composition consisting principally of Co and Ni or may have a composition consisting essentially of only Co and Ni. When lower layer portion consists essentially of only Co and Ni, the amount of Co is preferably within a range of 30~80 at %. The lower layer portion may contain other elements described above such as Zr in addition to Co and Ni, in this case, the amount of each element is preferably within the range described above.

The lower layer portion need not be a layer of one uniform composition but may be a plurality of layers of two or more different compositions. The boundary between the surface and lower layers inclusive of the surface layer need not be homogeneous and the composition may change in the direction of film thickness of the magnetic film as a whole.

The total film thickness of the entire magnetic film is preferably within a range of 10~100 nm. If it is less than 10 nm, the effect as the magnetic recording medium is low and if it exceeds 100 nm, the magnetic film is not suitable for high density recording.

In the present invention, the magnetic film is a thin film. Thin film means a layer having a structure according to thin film technology, for example a metallic magnetic thin film formed by spattering, plating, vacuum deposition, or the like.

In the magnetic recording medium of the present invention, an intermediate layer of Cr, Mo, W or a Cr alloy such as Cr-Ti or Cr-Si may be disposed between the non-magnetic substrate and the magnetic layer. This intermediate layer is described in, for example, Japanese Patent Laid-Open No. 29317/1988 and any of the intermediate layers disclosed in such references can be applied to the present invention. The intermediate layer is preferably from about 10 to about 700 nm thick.

In magnetic recording media using a metallic thin film as the magnetic layer, in general, a non-magnetic protective film consisting of carbon or the like is disposed on the surface of the magnetic layer to improve slide resistance reliability. Such a non-magnetic protective film is preferably disposed in the magnetic recording medium of the present invention, too. The non-magnetic protective film is preferably from 10 to 100 nm thick. If the thickness exceeds 100 nm, spacing loss becomes great and this is not preferable from the aspect of recording reproducing characteristics.

Furthermore, in ordinary magnetic recording media, a lubricant such as fluorinated polyether or the like is often coated on the magnetic film or the non-magnetic protective film. In the magnetic recording medium of the present invention, such a lubricant can also be used by coating. The lubricant is preferably within a range of 1~30 nm thick.

Improving the recording density in a magnetic recording medium increases the coercive force of the magnetic film. However, since the write capacity or magnetomotive force is limited, the over-write characteristics deteriorate when an attempt is made to improve coercive force. Generally, the magnetomotive force of the magnetic head is high in the proximity of the gap and drops progressively at portions further therefrom. Accordingly, recording can be made more easily in the surface layer and becomes difficult in the lower layer. It is considered that this is the cause of the deterioration of the over-write characteristics. Therefore, the over-write characteristics can be improved by controlling the coercive force in the direction of the film thickness of the magnetic recording medium to make the coercive force high in the surface layer and low in the lower layer.

Hereinafter, an embodiment of the present invention will be explained with reference to FIG. 1.

FIG. 1 is a schematic cross-sectional view of a magnetic recording medium of the present invention having a thin film technology magnetic layer. Non-magnetic base layers 12, 12' are formed on a Ni-P plated Al alloy substrate 11 and lower magnetic layers 13, 13', intermediate magnetic layers 14, 14', upper magnetic layers 15, 15' and non-magnetic protective layers 16, 16', which contain a lubricant film, are further formed.

Next, the production method of this magnetic recording medium will be described. Cr layers of 250 nm thick as non-magnetic base layers 12, 12' were formed on a Ni-P plated Al alloy substrate corrugated in the circumferential direction with average surface coarseness of 10 nm in the center line and having a diameter of 130 mm by a DC magnetron method at an Ar gas pressure of 10 mTorrs, a substrate temperature of 100° C. and input power of 3 W/cm$^2$; and the lower magnetic layers 13, 13', intermediate magnetic layers 14, 14' and upper magnetic layers 15, 15' were formed in the thickness of 20 nm using targets of $Co_{72}Ni_{22}Zr_6$ (the numbers representing at %; herein), $Co_{67}Ni_{27}Zr_6$ and $Co_{59}Ni_{35}Zr_6$, respectively, by the DC magnetron method at the same gas pressure and the same substrate temperature as described above but at the power of 0.5 W/cm$^2$. Thereafter, C was formed to a film thickness of 30 nm by the DC magnetron method, under the same conditions as the non-magnetic protective film 16, 16'. There was thus obtained the magnetic recording medium.

For comparison, three additional kinds of magnetic recording media, comparative examples, each having a 60 nm single magnetic layer, were produced under the same condition as described above by use of the targets $Co_{72}Ni_{22}Zr_6$, $CO_{67}Ni_{22}Zr_6$ and $Co_{59}Ni_{35}Zr_6$, respectively. The non-magnetic base layers and the non-magnetic protective films were formed in the same way as described above.

Figure 2:
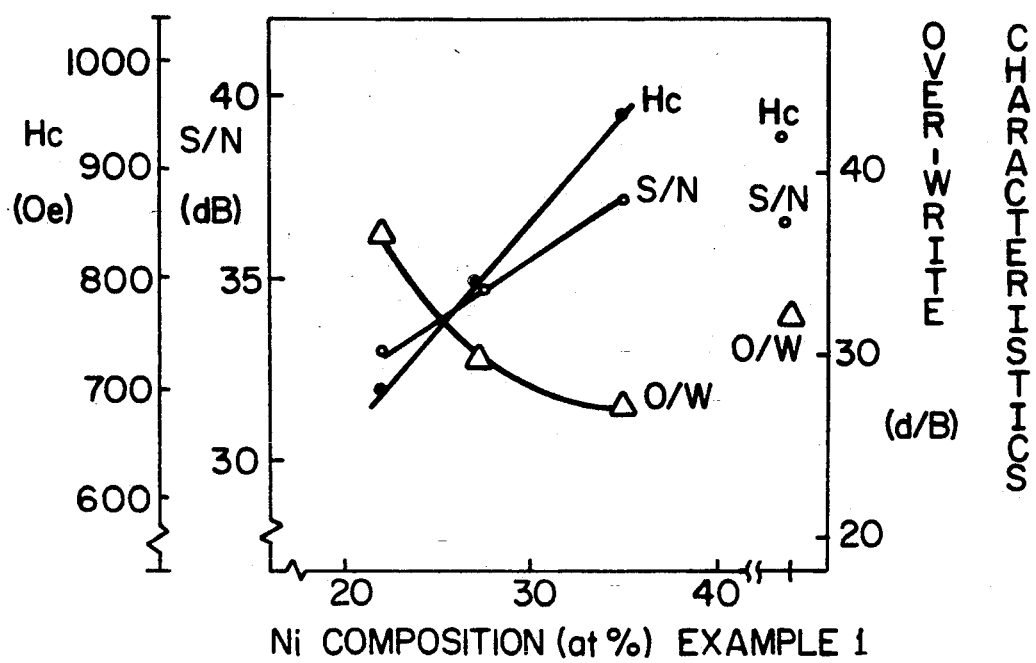
FIG. 2 is a diagram showing the magnetic characteristics of the magnetic recording medium and useful for explaining the present invention.

The magnetic characteristics of these four kinds of media were compared and evaluated for metal-in-gap type magnetic heads (MIG heads) with the result shown in FIG. 2. In the case of the single composition magnetic layer of each of the prior art type of comparative examples, the coercive force and the S/N ratio as well are improved by increasing the Ni composition in the magnetic film but the over-write characteristics deteriorated. In contrast to the comparative examples that are representative of the prior art the media of the present invention have the magnetic film characteristics of the S/N ratio corresponding to those of a magnetic film having about 33 at % of Ni composition and the over-write characteristics corresponding to those of a magnetic film having about 25 at % of Ni composition.

According to the present invention additive examples of magnetic recording media having magnetic layers having various compositions were produced in the same way as in Example 1. The DC magnetron conditions were an Ar gas pressure of 15 mTorrs, power of 1 W/cm$_2$ and a substrate temperature of 150° C. The Cr film as the non-magnetic base layer was 300 nm thick and the C film as the non-magnetic protective film was 35 nm thick. The thickness of each magnetic layer was 20 nm in the same way as in Example 1. The composition of each magnetic layer is shown in Table 1 and the magnetic characteristics of the resulting magnetic recording medium are shown in Table 2.

TABLE 1

| No. | upper magnetic layer | intermediate magnetic layer | lower magnetic layer |
|---|---|---|---|
| 2 | $Co_{55}Ni_{40}Zr_5$ | $Co_{65}Ni_{30}Zr_5$ | $Co_{70}Ni_{20}Cr_{10}$ |
| 3 | $Co_{55}Ni_{40}Ta_5$ | $Co_{65}Ni_{30}Ta_5$ | $Co_{70}Ni_{20}Cr_{10}$ |
| 4 | $Co_{55}Ni_{40}Ti_5$ | $Co_{65}Ni_{30}Ti_5$ | $Co_{70}Ni_{20}Cr_{10}$ |
| 5 | $Co_{55}Ni_{40}Hf_5$ | $Co_{65}Ni_{30}Hf_5$ | $Co_{70}Ni_{20}Cr_{10}$ |
| 6 | $Co_{55}Ni_{40}Nb_5$ | $Co_{65}Ni_{30}Nb_5$ | $Co_{70}Ni_{20}Cr_{10}$ |
| 7 | $Co_{55}Ni_{40}Ru_5$ | $Co_{65}Ni_{30}Ru_5$ | $Co_{70}Ni_{20}Cr_{10}$ |
| 8 | $Co_{55}Ni_{40}Rh_5$ | $Co_{65}Ni_{30}Rh_5$ | $Co_{70}Ni_{20}Cr_{10}$ |
| 9 | $Co_{55}Ni_{35}Pt_{10}$ | $Co_{60}Ni_{30}Pt_{10}$ | $Co_{70}Ni_{20}Cr_{10}$ |

TABLE 2

| No. | Hc (Oe) | S/N (dB) | O/W (dB) |
|---|---|---|---|
| 2 | 1000 | 38 | 34 |
| 3 | 1050 | 39 | 32 |
| 4 | 950 | 38 | 35 |
| 5 | 980 | 37 | 34 |
| 6 | 940 | 37 | 35 |
| 7 | 900 | 36 | 36 |
| 8 | 930 | 36 | 35 |
| 9 | 1300 | 42 | 30 |

EXAMPLES 10~18

According to the present invention, further examples of magnetic recording media having upper and lower layers for each of the magnetic layers and, having various compositions were produced in the same way as in Example 1. Incidentally, the DC magnetron conditions were an Ar gas pressure of 7 mTorrs, power of 2 W/cm$^2$ and a substrate temperature of 200° C. The thickness of each magnetic layer was 30 nm. The Cr film as the non-magnetic base layer was 400 nm and the C film as the non-magnetic protective layer was 40 nm. The composition of each magnetic layer is shown in Table 3 and the magnetic characteristics of the resulting recording media are shown in Table 4.

TABLE 3

| No. | upper magnetic layer | lower magnetic layer |
|---|---|---|
| 10 | $Co_{45}Ni_{50}Zr_5$ | $Co_{70}Ni_{20}Cr_{10}$ |
| 11 | $Co_{55}Ni_{40}Cr_5$ | $Co_{70}Ni_{20}Cr_{10}$ |
| 12 | $Co_{50}Ni_{40}Zr_5Cr_5$ | $Co_{70}Ni_{20}Cr_{10}$ |
| 13 | $Co_{50}Ni_{40}Ti_5Cr_5$ | $Co_{70}Ni_{20}Cr_{10}$ |
| 14 | $Co_{55}Ni_{40}Zr_5$ | $Co_{70}Ni_{30}$ |
| 15 | $Co_{50}Ni_{45}Zr_5$ | $Co_{65}Ni_{30}Pt_5$ |
| 16 | $Co_{50}Ni_{45}Zr_5$ | $Co_{70}Ni_{15}Cr_{15}$ |
| 17 | $Co_{50}Ni_{40}Zr_5Pt_5$ | $Co_{70}Ni_{10}Cr_{20}$ |
| 18 | $Co_{50}Ni_{40}Zr_5Cr_5$ | $Co_{70}Ni_{20}Cr_{10}$ |

TABLE 4

| No. | Hc (Oe) | S/N (dB) | O/W (dB) |
| --- | --- | --- | --- |
| 10 | 1100 | 39 | 32 |
| 11 | 1150 | 38 | 32 |
| 12 | 1200 | 39 | 33 |
| 13 | 1150 | 38 | 33 |
| 14 | 900 | 35 | 36 |
| 15 | 1180 | 37 | 32 |
| 16 | 1000 | 36 | 35 |
| 17 | 1250 | 35 | 33 |
| 18 | 1100 | 36 | 34 |

Substantially the same effect can be obtained when elements such as V, and Pd are used in addition to the principle components of Ni and Co.

In accordance with the present invention, coercive force of the surface layer can be increased effectively by controlling the coercive force in the direction of thickness of the magnetic film of the magnetic recording medium, while at the same time providing a magnetic recording medium having a high S/N ratio and excellent over-write characteristics.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A magnetic recording medium, comprising:
    a non-magnetic substrate;
    a magnetic layer of Co and Ni as its principal components on said non-magnetic substrate, said magnetic layer including a plurality of portions distributed between the nonmagnetic substrate and a surface of the magnetic layer remote from the substrate, the Ni content of said magnetic layer being greater at portions closer to the surface of said magnetic layer remote from the substrate in the direction of its thickness;
    the Ni content of at least one portion that is closer to the surface of said magnetic layer than to the substrate being 20 to 50 at %;
    said magnetic layer having a thickness of 10-100 nm.; and
    the portions closer to the surface of said magnetic layer remote from the substrate having a composition consisting essentially of Co, Ni and at least one element selected from the group consisting of Zr, Ti, Pt, Ru, Ta, Rh, V, Nb, Cr and Pd.

2. A magnetic recording medium according to claim 1, wherein the amount of said Co is within the range of 30 to 60 at %.

3. A magnetic recording medium according to claim 1, wherein the amount of elements within said magnetic layer other than said Co and Ni are within the range of 0.1 to 20 at %.

4. A magnetic recording medium according to claim 1, wherein the total amount of said Ni and all elements other than said Co is in the range of 40 to 70 at %.

5. A magnetic recording medium according to claim 1, wherein said magnetic layer has a thickness of 10-100 nm.

6. A magnetic recording medium according to claim 1, wherein the lower layer of said magnetic layer that is between said substrate and the portions closest to the surface is principally composed of Co and Ni, with Co being in the range of 30-80 at %.

7. A magnetic recording medium according to claim 1, wherein said magnetic layer comprises separate layers of different composition.

8. A magnetic recording medium according to claim 2, wherein said magnetic layer comprises separate layers of different composition.

9. A magnetic recording medium according to claim 5, wherein said magnetic layer comprises separate layers of different composition.

10. A magnetic recording medium according to claim 6 wherein said magnetic layer comprises separate layers of different composition.

11. A magnetic recording medium according to claim 1, wherein said magnetic layer is a metal thin film.

12. A magnetic recording medium according to claim 1, further including
    a non-magnetic protective film on the opposite side of said magnetic layer from said non-magnetic substrate.

13. A magnetic recording medium according to claim 12, wherein said protective film includes carbon to provide means for improving slide resistance.

14. A magnetic recording medium according to claim 13, further including a lubricating film on the outermost surface of said medium on the side of said magnetic layer opposite from said non-magnetic substrate.

15. A magnetic recording medium according to claim 1, further including a lubricating film on the outermost surface of said medium on the side of said magnetic layer opposite from said non-magnetic substrate.

16. A magnetic recording and reproducing disk including the magnetic recording medium according to claim 1 for use with a writing head providing a writing force,
    wherein said magnetic layer is a thin metal film increasing the recording density capacity of the disk and for increasing the over-write characteristic of the a metal thin film means in the axial direction toward said substrate to compensate for the reduction in the writing force in the axial direction toward the substrate, which writing force is produced by the adjacent writing head.

17. A magnetic recording and reproducing disk according to claim 16, wherein
    the at % of each said Co and Ni changes in the axial direction to provide said means.

18. A magnetic recording and reproducing disk according to claim 16, wherein there is at least one intermediate layer between said metal thin film means and said substrate.

19. A magnetic recording and reproducing disk according to claim 16, including a protective film of 10 to 100 nm thick on the surface of said metal thin film means.

20. A magnetic recording and reproducing disk according to claim 19, wherein the protective film is carbon.

21. A magnetic recording and reproducing disk according to claim 16, including a lubricant film of 1 to 30 nm thick on the outermost surface of the disk.

22. A magnetic recording and reproducing disk according to claim 16 wherein
    said metal thin film means comprises at least two separate thin films, with the at % of Co decreasing and the at % of Ni increasing from the innermost surface to the outermost surface of said metal thin film means to constitute said means.

23. A magnetic recording and reproducing disk according to claim 22, wherein there are at least three of the separate metal thin films.

* * * * *